US010701002B1

(12) United States Patent
Schroder (10) Patent No.: US 10,701,002 B1
(45) Date of Patent: Jun. 30, 2020

(54) SYSTEM AND METHOD FOR MEMORY DEALLOCATION

(71) Applicant: Marvell International Ltd., Hamilton (BM)

(72) Inventor: Jacob Jul Schroder, Lyngby (DK)

(73) Assignee: Marvell International Ltd., Hamilton (BM)

( * ) Notice: Subject to any disclaimer, the term of this patent is extended or adjusted under 35 U.S.C. 154(b) by 252 days.

(21) Appl. No.: 15/835,179

(22) Filed: Dec. 7, 2017

Related U.S. Application Data (60) Provisional application No. 62/431,226, filed on Dec. 7, 2016.

(51) Int. Cl.
*H04L 12/861* (2013.01)
*H04L 12/851* (2013.01)
*H04L 12/835* (2013.01)

(52) U.S. Cl.
CPC ...... *H04L 49/9089* (2013.01); *H04L 47/2441* (2013.01); *H04L 49/9005* (2013.01); *H04L 47/30* (2013.01)

(58) Field of Classification Search
CPC ............. H04L 49/9089; H04L 47/2441; H04L 49/9005; H04L 49/201; H04L 49/901
See application file for complete search history.

(56) References Cited

U.S. PATENT DOCUMENTS

| | | | |
|---|---|---|---|
| 7,616,633 B2* | 11/2009 | Aiken | H04L 29/06 370/389 |
| 7,765,328 B2 | 7/2010 | Bryers et al. | |
| 7,924,860 B1 | 4/2011 | Frailong et al. | |
| 8,111,690 B2 | 2/2012 | Hussain et al. | |
| 9,118,576 B2 | 8/2015 | Roitshtein | |
| 9,455,907 B1 | 9/2016 | Shumsky et al. | |
| 9,467,399 B2 | 10/2016 | Wohlgemuth et al. | |
| 9,479,620 B2 | 10/2016 | Levy et al. | |

(Continued)

FOREIGN PATENT DOCUMENTS

WO    WO-99/07180 A2    2/1999

OTHER PUBLICATIONS

Shpiner et al., "Reducing the Reordering Delay in Multi-Core Network Processors," Technical Report TR12-01, Comnet, Technion, Israel, undated (12 pages).

*Primary Examiner* — Omer S Mian (57) ABSTRACT

A method for deallocating memory in a first network device is described. A multicast packet is received and stored in memory cells. Egress descriptors corresponding to the multicast packet are generated for transmission of the multicast packet. A final count of the egress descriptors is determined. The egress descriptors are processed for transmission of the multicast packet and a value of a signed reference counter corresponding to the multicast packet is updated in a first direction before the final count has been determined and after a copy of the multicast packet has been received by an egress port of the first network device. The value of the signed reference counter is updated in a second direction opposite the first direction by the final count after determination of the final count. The memory cells are deallocated when cumulative first direction updates are equal to the second direction update.

20 Claims, 7 Drawing Sheets

(56) References Cited

U.S. PATENT DOCUMENTS

| | | |
|---|---|---|
| 2004/0008716 A1* | 1/2004 | Stiliadis ............... H04L 12/1881 |
| | | 370/429 |
| 2014/0169378 A1 | 6/2014 | Shumsky et al. |
| 2014/0177470 A1 | 6/2014 | Roitshtein et al. |
| 2014/0192815 A1 | 7/2014 | Shumsky et al. |
| 2015/0071079 A1 | 3/2015 | Kadosh et al. |
| 2017/0163567 A1* | 6/2017 | Roitshtein ............. H04L 49/201 |
| 2017/0280343 A1 | 9/2017 | Chu et al. |
| 2017/0295571 A1 | 10/2017 | Chu et al. |
| 2017/0339041 A1 | 11/2017 | Mizrahi et al. |
| 2017/0339062 A1 | 11/2017 | Mayer-Wolf et al. |
| 2017/0339074 A1 | 11/2017 | Melman et al. |
| 2017/0339075 A1 | 11/2017 | Arad |
| 2017/0339259 A1 | 11/2017 | Arad et al. |
| 2017/0346714 A1 | 11/2017 | Mizrahi |
| 2017/0353403 A1 | 12/2017 | Zemach et al. |

\* cited by examiner

SYSTEM AND METHOD FOR MEMORY DEALLOCATION

CROSS-REFERENCES TO RELATED APPLICATIONS

This disclosure claims the benefit of U.S. Provisional Patent Application No. 62/431,226, entitled "Signed Buffer Reference Counter" and filed on Dec. 7, 2016, the disclosure of which is incorporated herein by reference in its entirety.

This application is related to U.S. patent application Ser. No. 15/598,041, entitled "Method and Apparatus for Processing Packets in a Network Device and filed on May 17, 2017, the disclosure of which is incorporated herein by reference in its entirety.

FIELD OF THE DISCLOSURE

The present disclosure relates generally to communication systems and, more particularly, to deallocation techniques for memory cells.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Some network switches store incoming packets in a packet buffer, for example, while egress interfaces for the packets are identified by a packet processor and while the egress interfaces process other packets. Packets are later transferred from the packet buffer towards an identified egress interface. When multiple copies of a packet are to be transferred, for example, for a multicast or broadcast packet, a single copy of the packet is maintained in the packet buffer to be read by each of the egress interfaces through which the packet is to be transmitted.

SUMMARY

In an embodiment, a method for deallocating memory in a first network device includes: receiving, at the first network device, a multicast packet received from a computer network and storing the multicast packet in one or more memory cells of a memory unit of the first network device; generating, by the first network device, a plurality of egress descriptors corresponding to the multicast packet, the egress descriptors for transmission of the multicast packet from the first network device to a plurality of second network devices in the computer network, the generating including determining a final count of the plurality of egress descriptors; processing, by the first network device, ones of the plurality of egress descriptors for transmission of the multicast packet from the first network device to the corresponding plurality of second network devices, the processing including updating a value of a signed reference counter corresponding to the multicast packet in a first direction before the final count has been determined and after a copy of the multicast packet has been received by an egress port of the first network device for a transmission corresponding to an egress descriptor of the plurality of egress descriptors; updating, by the one or more integrated circuits, the value of the signed reference counter in a second direction opposite the first direction by the final count of the plurality of egress descriptors after the final count has been determined; and deallocating, by the one or more integrated circuits, the one or more memory cells when cumulative updates to the value of the signed reference counter in the first direction are equal to the update of the value of the signed reference counter in the second direction and maintaining the multicast packet in the one or more memory cells while the cumulative updates are not equal to the final count.

In another embodiment, a first network device includes: an ingress port configured to receive a multicast packet from a computer network; a plurality of egress ports from which the multicast packet is to be transmitted; a memory unit having at least one memory cell; and one or more integrated circuits. The one or more integrated circuits are configured to: store the multicast packet in one or more memory cells of the memory; generate a plurality of egress descriptors corresponding to the multicast packet, the egress descriptors for transmission of the multicast packet from the first network device to a plurality of second network devices in the computer network, and to determine a final count of the plurality of egress descriptors; process ones of the plurality of egress descriptors for transmission of the multicast packet from the first network device to the corresponding plurality of second network devices, the processing including updating a value of a signed reference counter corresponding to the multicast packet in a first direction before the final count has been determined and after a copy of the multicast packet has been received by an egress port of the first network device for a transmission corresponding to an egress descriptor of the plurality of egress descriptors; update the value of the signed reference counter in a second direction opposite the first direction by the final count of the plurality of egress descriptors after the final count has been determined; and deallocate the one or more memory cells when cumulative updates to the value of the signed reference counter in the first direction are equal to the update of the value of the signed reference counter in the second direction and maintaining the multicast packet in the one or more memory cells while the cumulative updates are not equal to the final count.

DETAILED DESCRIPTION

In various embodiments described herein, a network device receives a multicast packet from a computer network and stores the multicast packet in one or more memory cells of the network device. A packet processor of the network device processes the multicast packet (or a related data structure) to determine two or more physical or virtual egress ports of the network device from which a copy of the multicast packet is to be transmitted and to generate corresponding packet descriptors for the respective copies. The egress ports, based on the packet descriptors, read respective copies of the multicast packet for transmission of the multicast packet. In other words, a single copy of the multicast packet is stored in the memory cell, instead of separate copies for each of the physical or virtual egress ports. After the multicast packet (e.g., the respective copies) has been transmitted via the egress ports, the network device deallocates the memory cells, for example, to be used by another packet received by the network device.

The packet processor determines the egress ports by processing a list of potential destinations (e.g., a list of egress ports of the network device) and, for each potential destination, making an individual determination on whether to forward the multicast packet to the potential destination, in an embodiment. The packet processor generates egress descriptors for ones of the determined destinations and the memory cells are deallocated after each copy of the multicast packet has been transmitted by an egress port, in an embodiment.

In some embodiments, the network device generates a single type of packet descriptor that i) a packet processor utilizes to process the packet (e.g., ingress processing), and ii) a queue manager utilizes to maintain a queue order of packets (e.g., egress processing), as described herein. In an embodiment, the single type of packet descriptor operates as both an ingress descriptor and an egress descriptor, as described herein. In various embodiments, the single type of packet descriptor includes information from a header of the packet, a payload portion of the packet, and/or other information that the packet processor utilizes for processing of the packet. In an embodiment, processing of the packet includes at least determining a port or ports to which the packet is to be forwarded. In an embodiment, processing of the packet also includes modifying a portion of the packet (e.g., the header) based on a processing result for the packet. For multicast packets and broadcast packets, the packet processor generates a plurality of the single type of packet descriptor, in an embodiment. In an embodiment, for example, the packet processor generates one packet descriptor per destination for a multicast packet.

In some embodiments, instead of generating the single type of packet descriptor, the network device generates a first packet descriptor (e.g., packet descriptor 164 generated by a receive processor, not shown) and one or more second packet descriptors (e.g., packet descriptors 165). In an embodiment, the network device generates the first packet descriptor as a "full" packet descriptor or "ingress" descriptor that the packet processor utilizes to process the packet (e.g., ingress processing) and generates the second packet descriptor as a "lean" packet descriptor or "egress" descriptor that the network device 100 utilizes to maintain the queue order of packets at the egress ports (e.g., egress processing), for example, as described in U.S. patent application Ser. No. 15/598,041. In an embodiment, for example, the egress descriptor is reduced in size relative to the ingress descriptor (i.e., contains fewer bits) and enables an egress port to generate a packet for egress by reading packet portions from memory cells of the network device. In an embodiment, the egress descriptor includes only information needed to retrieve the packet from the memory cell and to properly forward the packet to the corresponding destination. For simplicity, an "egress descriptor" as used herein refers to either the single type of packet descriptor or the lean packet descriptor. In other words, the egress descriptor refers to a packet descriptor suitable for egress processing.

In some embodiments described herein, the network device includes a centralized, shared packet memory that stores packet payloads and headers during various stages of processing. To improve utilization of system resources, processing of packet header information (including generating modified headers for packets to be transmitted) is performed at one or more packet processors using packet descriptors representing packets and containing information for processing, while a payload of the packet is stored in the centralized packet memory. Egress processing for packaging stored packet payloads together with the headers that have been modified by the processing is subsequently performed in a distributed manner at one or more egress processors that are associated with and/or located near egress ports. The egress operations employ descriptors that i) include pointers for reading a packet payload and a modified header from centralized memory, and ii) are used to manage the location of a packet in an egress queue.

Various embodiments of the network device described herein provide improved performance and management of system resources, for example, lower latency for packet processing and/or lower resource requirements for tracking memory usage. In an embodiment, for example, packet descriptors for multicast packets and broadcast packets are released for egress processing without waiting for a determination of a number of packet descriptors to be generated, which is needed to properly deallocate memory that stores the multicast packet or broadcast packet. In an embodiment, packet descriptors (e.g., egress descriptors) that have been placed in an egress queue for transmission of corresponding packets are reduced in size (i.e., contain fewer bits), which reduces the size of the egress queue. Challenges for efficiently managing the centralized packet memory, without introducing unnecessary latency, are amplified when processing multicast and broadcast packets, for which there may not be equality in the number of times that a payload and processed headers need to be read out from a centralized memory by distributed processing resources. To efficiently manage the centralized packet memory, the network device is configured to determine when each of the copies of the multicast packet has been transmitted so that the corresponding memory cells can be deallocated.

To determine when each of the copies of the multicast packet has been transmitted, the network device determines a final count of the egress descriptors (e.g., two, three, or more) and stores the final count in the packet descriptors, for example, the single type of packet descriptor or the egress descriptor, in an embodiment. A reference counter indicates when a number of copies that have been transmitted is equal to the final count, in an embodiment. When the packet processor provides the final count to the reference counter as a value within the packet descriptors, the packet descriptors are delayed from further processing because the final count is not known until after each packet descriptor for the multicast packet has been generated, in some embodiments.

In the embodiments described herein, the network device includes a signed reference counter that corresponds to the multicast packet, in other words, a counter that can both be incremented and decremented. In an embodiment, the packet processor forwards ones of the packet descriptors to their corresponding egress ports without including the final count. In an embodiment, the network device decrements the signed reference counter (e.g., subtracts a value of "1") for each transmission of a copy of the multicast packet and adds the final count to the signed reference counter when the final count has been determined. In this way, the signed reference counter returns to an initial value (e.g., zero) when cumulative decrements are equal to the final count.

FIGS. 1A, 1B, 2A, 2B, 3A, and 3C are simplified block diagrams of an example network device 50 in which memory deallocation techniques of the present disclosure are implemented, according to an embodiment. The network device 50 receives a packet 60 from a first network device (e.g., network device 102, shown in FIG. 4) that is to be forwarded to a plurality of network devices (e.g., network devices 103a, 103b, 103c, shown in FIG. 4) via one or more egress ports (e.g., egress ports EP1, EP2, EP3). The packet 60 is a multicast packet or broadcast packet, in various embodiments and/or scenarios. Instead of storing multiple copies of the packet in a memory unit 70 (e.g., one copy for each of the plurality of destination network devices), the network device 50 stores the single packet 60 in the memory unit 70 and a descriptor generator 72 generates a plurality of egress descriptors that "point to" or refer to the packet 60 in the memory unit 70. The egress ports EP1, EP2, and EP3 read the packet 60 from the memory unit 70 and the network device 50 removes the packet 60 from the memory unit 70 (e.g., by deallocating a portion of the memory unit 70 used by the packet 60) after the packet 60 has been copied by each of the egress ports EP1, EP2, and EP3.

The network device 50 includes a signed reference counter 74 and a comparator 75 to determine when the memory unit 70 can be deallocated, in an embodiment. A descriptor counter 73 of the network device 50 determines a final count of the number of packet descriptors that have been generated (or will be generated) for the packet 60. In some embodiments, the descriptor generator 72 and descriptor counter 73 are implemented by a packet processor 71 of the network device 50.

In an embodiment, the network device 50 updates the signed reference counter 74 in a first direction by adding the final count to the counter and updates the signed reference counter 74 in a second direction by decrementing the counter for each instance of the egress ports EP1, EP2, an EP3 reading the packet from memory. The comparator 75 determines when the signed reference counter 74 reaches zero, in other words, when cumulative updates to the signed reference counter 74 in the first direction are equal to update of the signed reference counter 74 in the second direction. After the signed reference counter 74 has reached zero, the comparator 75 causes the memory unit 70 to deallocate the portion of the memory unit 70 used to store the packet 60.

Figure 1A:
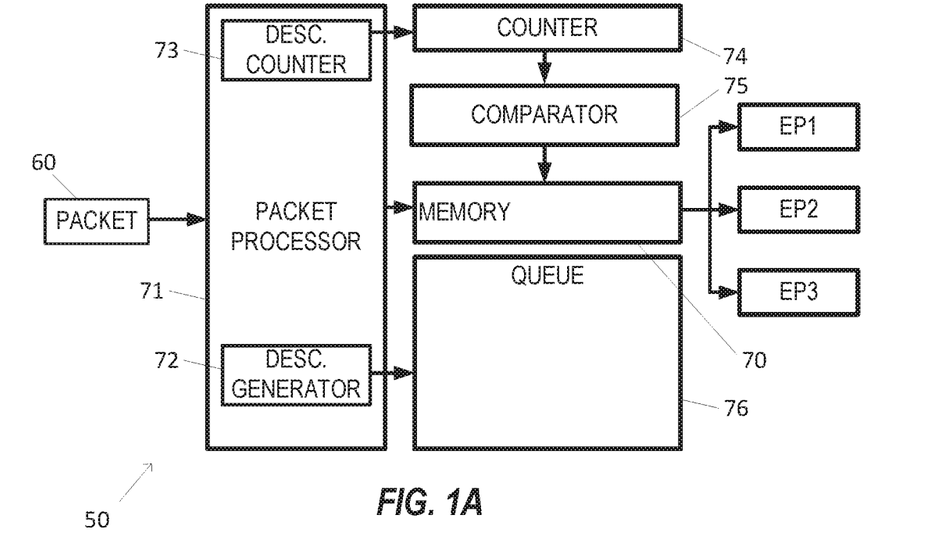
FIGS. 1A, 1B, 2A, 2B, 3A, and 3B are simplified block diagrams of an example network device in which memory deallocation techniques of the present disclosure are implemented, according to an embodiment.
Figure 1B:
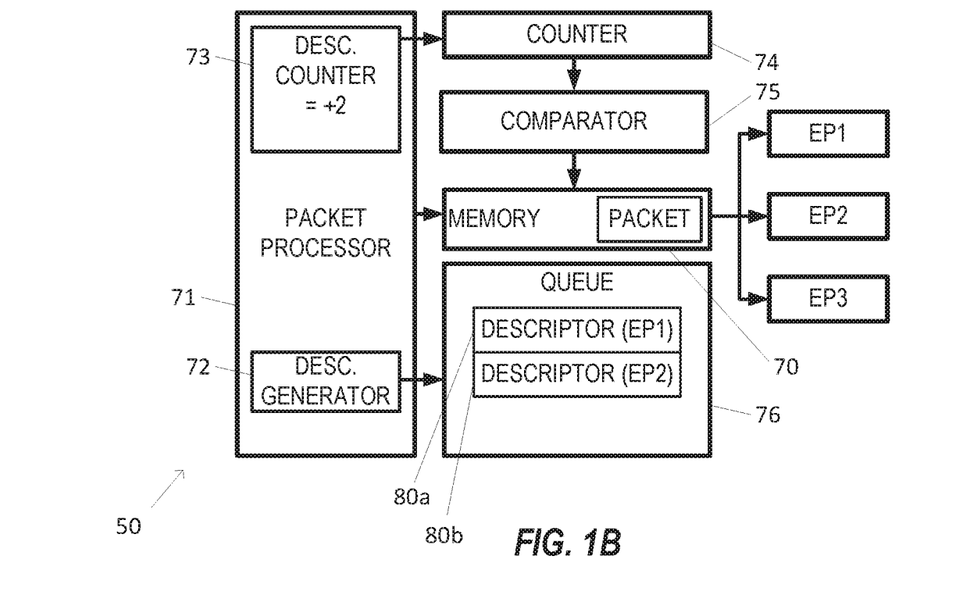

In FIG. 1A, the network device 50 receives the packet 60 and stores the packet 60 in the memory unit 70. In FIG. 1B, the descriptor generator 72 generates packet descriptors for the packet 60, for example, packet descriptor 80a for egress port EP1 and packet descriptor 80b for egress port EP2. In an embodiment, the packet descriptors 80a and 80b are egress descriptors, as described herein. In an embodiment, the network device 50 stores the packet descriptors 80 in a queue 76, for example, until the egress ports EP1 and EP2 are ready to process the packet descriptors for egressing copies of packet 60. In FIG. 1B, the final count of the number of packet descriptors for the packet 60 is not yet known. In an embodiment, for example, the packet processor 71 is busy processing other packets so that the final count determination is delayed. In another embodiment, for example, the network device 50 includes a large number of ports that require more processing time to determine the appropriate destinations for the packet. The descriptor counter 73 counts the number of generated packet descriptors (+2), for example, as the packet descriptors are generated, but does not yet update the signed reference counter 74, in an embodiment.

Figure 2A:
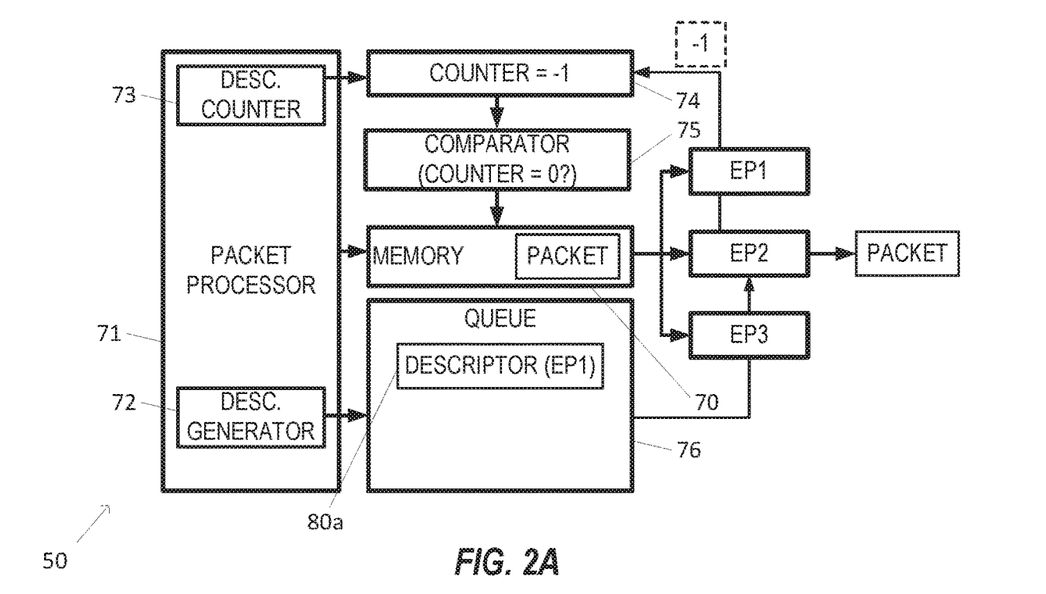
Figure 2B:
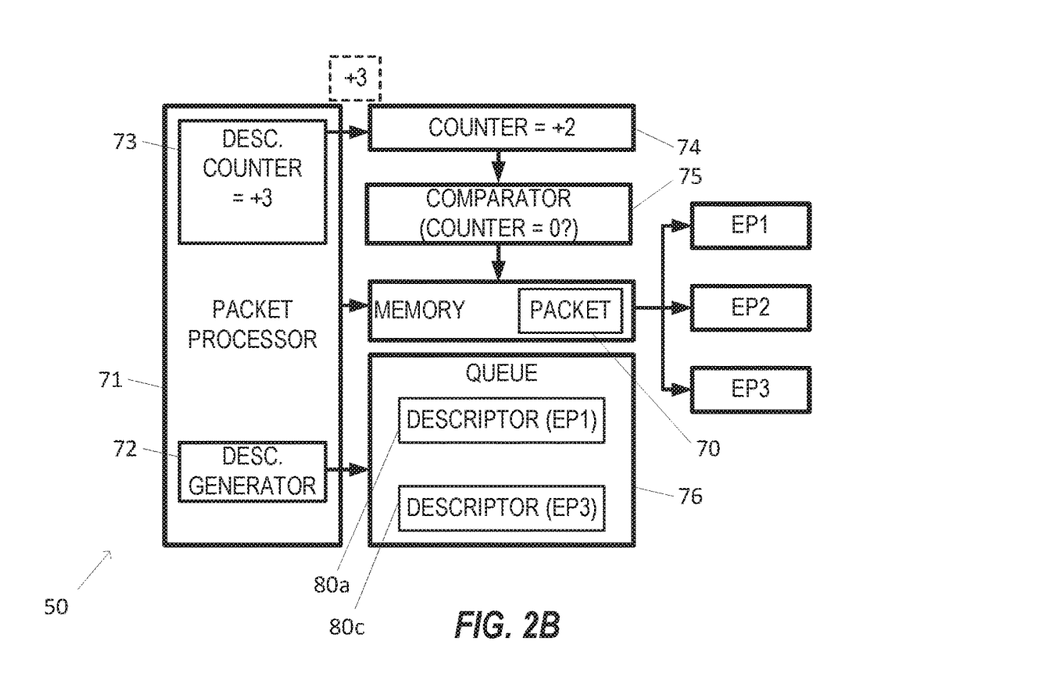

In FIG. 2A, the egress port EP2 prepares a packet corresponding to the packet descriptor 80b for egress and transmits a copy of the packet 60 to a network device (not shown). In an embodiment, when the egress port EP2 transmits the copy of the packet 60, the network device 50 decrements the signed reference counter 74 (−1), which updates the value of the signed reference counter 74 to −1. In FIG. 2B, the descriptor generator 72 generates packet descriptors for the packet 60, for example, packet descriptor 80c for egress port EP3, which is a final packet descriptor for the packet 60. The descriptor counter 73 updates the count of the number of generated packet descriptors to the final count (+3) and updates the signed reference counter 74 by adding the final count to the value of the signed reference counter (−1+3=+2). By waiting until the final count has been determined, the signed reference counter 74 reaches the value of 0 only when each of the plurality of egress descriptors has been processed, instead of moving back and forth across 0 (e.g. −1, −2, −1, 0, 1, 0, −1, etc.). Accordingly, the signed reference counter 74 provides a single counter that indicates progress for processing a multicast packet, instead of needing a first counter for the number of packets generated and a second counter for the number of packets processed.

Figure 3A:
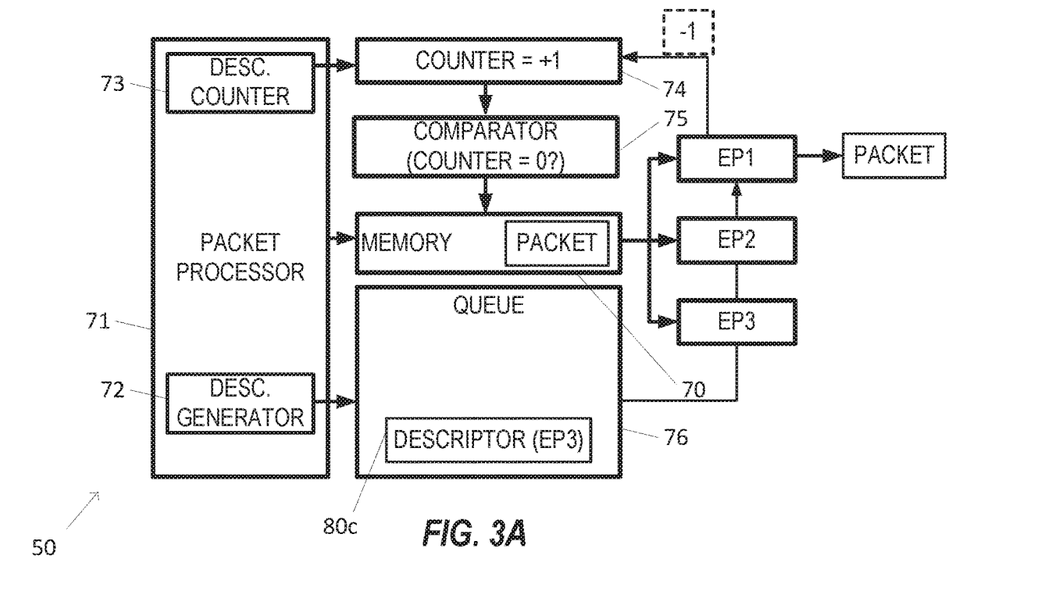
Figure 3B:
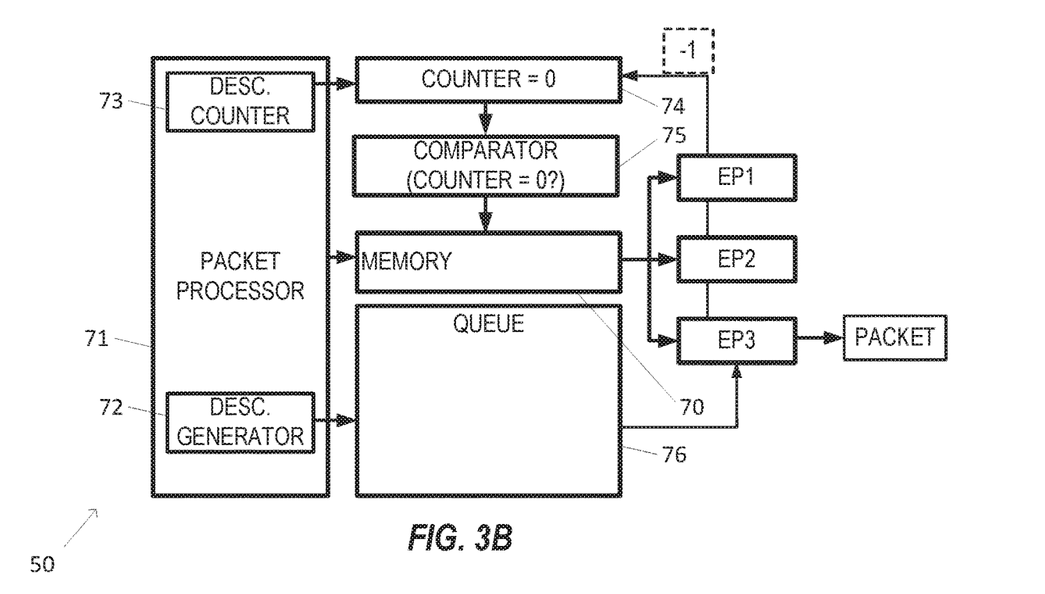

In FIG. 3A, the egress port EP1 prepares the packet descriptor 80a for egress and transmits a copy of the packet 60 to a network device (not shown). In an embodiment, when the egress port EP1 transmits the copy of the packet 60, the network device 50 decrements the signed reference counter 74 (−1), which updates the value of the signed reference counter 74 from +2 (previous value seen at FIG. 2B) to +1. In FIG. 3B, the egress port EP3 prepares the packet descriptor 80c and transmits a copy of the packet 60 to a network device (not shown). In an embodiment, when the egress port EP3 transmits the copy of the packet 60, the network device 50 decrements the signed reference counter 74 (−1), which updates the value of the signed reference counter 74 to from +1 to 0. The comparator 75 determines that the signed reference counter 74 has reached zero and causes the memory unit 70 to deallocate the portion of the memory unit 70 used by the packet 60.

Figure 4:
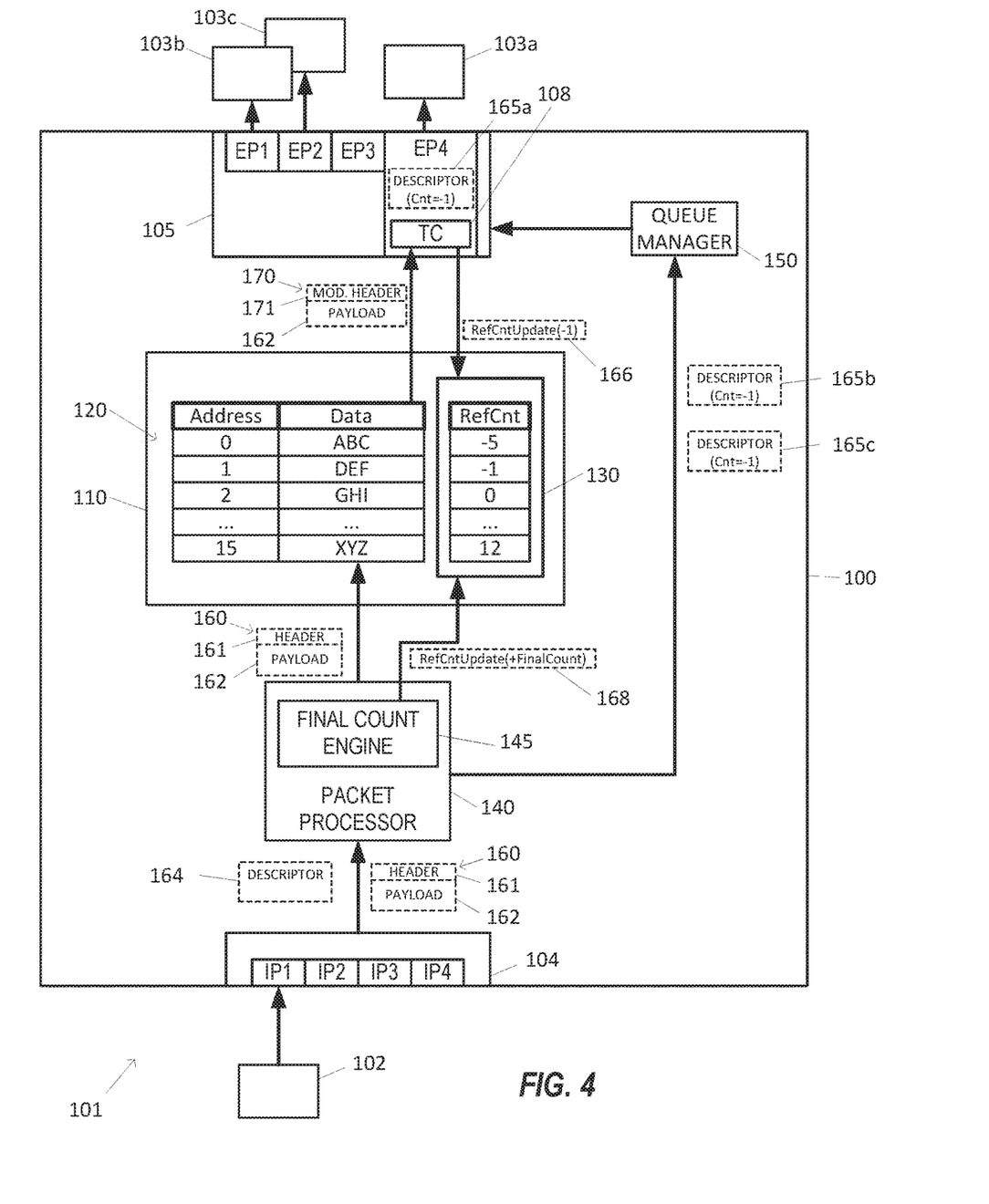
FIG. 4 is a block diagram of an example network device in which memory deallocation techniques of the present disclosure are implemented.

FIG. 4 is a block diagram of an example network device 100 in which memory deallocation techniques of the present disclosure are implemented, according to an embodiment. In an embodiment, the network device 100 implements features of the network device 50, described above. The network device 100 is a member of a computer network 101 in which memory deallocation techniques of the present disclosure are implemented, according to an embodiment. The members of the computer network 101 include the network device 100 (e.g., a first network device), a network device 102, and a plurality of second network devices 103. One or more of the network devices 100, 102, and 103 is a bridge, router, switch, or any other suitable network device configured to operate within a networked environment, in various embodiments. In some embodiments, one or more of the network devices 102 and 103 are similar to the network device 100, described below. In other embodiments, one or more of the network devices 102 and 103 are different from the network device 100 and are, for example, a conventional bridge, router, or other suitable network device. In the embodiment shown in FIG. 4, the network device 102 transmits a packet 160 to the network device 100 and the packet 160 is a multicast packet to be transmitted to the plurality of second network devices 103. Although the plurality of second network devices 103 is depicted as including three network devices 103a, 103b, and 103c, the plurality of second network devices 103 includes two, four, five, or any other suitable number of network devices, in other embodiments. In another embodiment, the multicast packet is a broadcast packet to be egressed from all egress ports of the network device 100.

In the embodiment shown in FIG. 4, the network device 100 includes a plurality of ingress ports 104 (including ingress ports IP1, IP2, IP3, and IP4), a plurality of egress ports 105 (including egress ports EP1, EP2, EP3, and EP4), a memory 110, a packet processor 140, and a queue manager 150. The plurality of ingress ports 104 are configured to receive packets from another network device (e.g., network device 102) and to copy the packets to the memory 110 for transmission to other network devices 103 of the computer network 101. The plurality of egress ports 105 is configured to receive a copy of the packets from the memory 110 for transmission to the other network devices, in an embodiment. In some embodiments, the egress ports 105 receive a data unit representing a packet to be transmitted, and prepare copies of packets to be transmitted by reading the packet from memory and including a modified header to the packets to be transmitted, based on results from processing. In an embodiment, for example, the egress port EP4 receives a descriptor 165a and prepares a packet 170 that includes the payload 162 of the packet 160 and a modified header 171. In an embodiment, the modified header 171 is a header that is based on the header 161 and is modified by the packet processor 140 or other suitable processors. In some embodiments, at least some of the ports are bidirectional ports that can act as either an ingress port to receive a network packet or an egress port to transmit a network packet. While FIG. 4 only shows eight ports, in other embodiments network device 100 includes any suitable number of ports which can be more than eight ports or less than eight ports. In some embodiments, ones of the plurality of egress ports 105 include respective transmission counters (TC) 108, described below.

In various embodiments, network device 100 is configured to handle unicast, multicast, and/or broadcast operations. FIG. 4 illustrates an embodiment in which network device 100 is capable of at least multicast operation, and is capable of a scenario in which a packet ingresses via an ingress port and egresses via a plurality of selected egress ports in a multicast manner. It is noted that, in other embodiments and/or scenarios, a packet may instead egress via all of the egress ports in a broadcast manner. The packet processor 140 generates a plurality of egress descriptors for a multicast packet or broadcast packet, where the plurality of egress descriptor corresponds to the plurality of other network devices 103. In some embodiments, the network device 100 includes multiple processors, for example, a receive processor, packet processor, and transmit processor, as described in U.S. patent application Ser. No. 15/598,041. In some scenarios, an egress port 105 receives two or more packet descriptors corresponding to the packet 160, for example, to transmit a copy of the packet 160 on different virtual local area networks (VLANs). In some embodiments, the packet processor 140 processes an ingress descriptor 164, received from a receive processor (not shown) or ingress port, and generates the plurality of egress descriptors as egress descriptors.

The memory 110 includes a plurality of memory cells 120, for example, memory cells corresponding to addresses 0, 1, 2, . . . 15 (e.g., 16 cells) as shown in the embodiment of FIG. 4. In other embodiments, the plurality of memory cells 120 includes a different number of memory cells, for example, 64 cells, 1024 cells, or another suitable number of cells. The memory 110 also includes one or more signed reference counters 130, described below. The plurality of memory cells 120 are configured to store packets (or portions thereof) received at the plurality of ingress ports, for example, while data corresponding to the packets is processed by one or more processors at least to determine an egress port of the network device 100 through which to transmit the packets. In an embodiment, the memory 110 is a centralized memory that is shared by one or more packet processors and/or ports of the network device 100.

The memory 110 includes suitable non-transitory memory devices such as a RAM, or any other suitable type of memory device, in various embodiments. The memory 110 in some embodiments is a high-bandwidth shared packet memory. In some embodiments and/or scenarios, the memory 110 is shared by the ports of the network device 100 for storing payloads of received packets and/or instances of multicast packets to be egressed according to a schedule or queue, for example, when a corresponding target egress port is congested. In one such scenario, an instance of a multicast packet to be transmitted via an egress port is stored in a corresponding egress queue of the memory 110 while another packet is transmitted by the egress port. In this scenario, the egress port is said to be "congested" when packet bandwidth targeting the egress port is greater than the bandwidth provided by the egress port. Thus, not all packets targeted for a given egress port necessarily will be transmitted immediately after they have been processed by the packet processor 140. In various embodiments, the plurality of memory units 120 facilitates one or more of complex scheduling, rate limiting, or assembly of packets.

The network device 100 stores packet payloads (e.g., payload 162), packet headers (e.g. header 161), and/or modified packet headers (e.g., header 171) in the memory 110. In some embodiments, the network device 100 generates the packets to be egressed separately from packet processing for forwarding decisions, for example, at an egress port or transmit processor (not shown) corresponding to an egress port. In an embodiment utilizing a single type of packet descriptor for an instance of a multicast packet, the packet descriptor 165a includes a pointer or memory reference to one or more memory cells of the memory 110 where one or more of the header and/or payload of the multicast packet are stored (e.g., a memory cell that stores the header 171 and a memory cell that stores the payload 162). In an embodiment utilizing the ingress packet descriptor and egress descriptors, the packet processor 140 utilizes the ingress packet descriptor (e.g., to modify the header 171 and/or determine an egress port) and generates the egress descriptors as the packet descriptors 165 to be stored by the queue manager 140. In an embodiment, the egress ports 105 generate an instance of a multicast packet by reading the payload of a packet and a modified header from the memory cells identified in the packet descriptor 165. In an embodiment, for example, the egress port EP4 reads the header 171 and the payload 162 as a packet 170 (e.g., an instance of the multicast packet 160 to be egressed).

The signed reference counter 130 is configured to indicate when a memory cell 120 (or a group of memory cells) that stores a multicast packet or broadcast packet can be deallocated, in an embodiment. In various embodiments, for example, the signed reference counter 130 indicates that the memory cell 120 can be deallocated when each copy of the packet has been transmitted by an egress port or after each copy of the packet has been transferred to the egress port. In the embodiment shown in FIG. 4, the network device 100 includes one signed reference counter 130 for each memory cell 120. In other embodiments, the network device 100 includes a number of signed reference counters 130 less than a number of memory cells 120 and supports a maximum number of simultaneously processed multicast packets (e.g., 10 multicast packets, 20 multicast packets, or another suitable number).

The network device 100 updates the signed reference counter 130 in a first direction (e.g., decrements or subtracts a value of "1") based on a transmission of a copy of the multicast packet, in various embodiments. In an embodiment, for example, the network device 100 updates the signed reference counter 130 in the first direction after a copy of the multicast packet has been received by an egress port. In other words, the egress port stores the copy of the multicast packet 160 in a local memory or egress queue (not shown) of the egress port so that the copy in the memory 110 is no longer needed by the egress port. In another embodiment, the network device 100 updates the signed reference counter 130 in the first direction after transmission of the copy of the multicast packet to another network device. In other embodiments, the network device 100 updates the signed reference counter 130 at a different suitable time.

The network device 100 determines a final count of a number of packet descriptors for a multicast packet (or broadcast packet) corresponding to a final count of a number of copies of the multicast packet to be egressed to a destination in the network and updates the signed reference counter 130 in a second direction, opposite the first direction, by the final count, in various embodiments. In an embodiment, the packet processor 140 updates the signed reference counter 130 by adding the final count to a current value of the signed reference counter 130. In this embodiment, updates in the first direction decrement the signed reference counter 130 so that when the value of the signed reference counter 130 reaches zero, which indicates that each of the packet descriptors for the multicast packet has been suitably processed, the corresponding memory cell 120 can be deallocated. In an embodiment, the packet processor 140 updates the signed reference counter 130 after generating the final packet descriptor. In another embodiment, the packet processor 140 updates the signed reference counter after the individual determinations on whether to forward the multicast packet to each potential destination of the list of potential destinations.

In some embodiments, the signed reference counter 130 is a register within the memory 110 that is associated with the memory cell 120. In an embodiment, the memory 110 includes a separate signed reference counter 130 for each memory cell 120 of the memory 110. In another embodiment, the signed reference counter 130 is a first memory cell within the memory 110 that identifies when one or more second memory cells within the memory 110 can be deallocated. In an embodiment, for example, a memory cell 120 has a size of 128 bits and includes an 8-bit signed reference counter for 16 different memory cells (e.g., bits 0 to 7 for a first memory cell, bits 8 to 15 for a second memory cell, etc.). In this embodiment, the 8-bit signed reference counter 130 allows for up to 127 copies ($2^7$ copies, −128 to +127) of a packet to be processed. In other embodiments, the signed reference counter 130 includes more or fewer bits, for example, 5, 6, 7, 9, or more bits. In other embodiments, the signed reference counter 130 is a portion of a memory controller (not shown) for the memory 110, a separate memory, or the packet processor 140.

The packet processor 140 and queue manager 150 process one or more portions of a received packet or other suitable data structures representing the packet, in an embodiment. A received packet 160 generally includes a header 161 and a payload 162. In an embodiment, the packet processor 140 identifies an egress port from which the received packet 160 is to be transmitted and provides an indication of the identified egress port to the queue manager 150. In an embodiment, the packet processor 140 includes a forwarding engine (not shown) that identifies the egress port from which the received packet 160 is to be transmitted. In an embodiment, the packet processor 140 includes a header alteration engine (not shown) that generates the modified header 171. In an embodiment, the packet processor 140 extracts packet headers from a packet and generates one or more packet descriptors 165 containing extracted header information and other information, representing the corresponding packets. In another embodiment, the packet processor 140 generates the packet descriptors 165 as "lean" packet descriptors that include the indication of the identified egress port. In an embodiment, the packet processor 140 includes a final count engine 145 configured to determine a final count of the number of generated packet descriptors 165 for a multicast packet or broadcast packet that are distributed among the various egress ports 105.

Packet processor 140 includes one or more modules for processing the generated packet descriptors 165 to perform various operations, in some embodiments. Generally, the packet processor 140 (e.g., including a bridging engine, in an embodiment) processes descriptors 164 and/or descriptors 165, and accesses various routing, forwarding and/or other suitable databases stored in a lookup memory (not shown), to perform forwarding operations for the corresponding packets.

Packet processor 140 includes one or more tangible/physical processors. In a first illustrative embodiment, packet processor 140 includes one or more processors configured to read and execute software or firmware instructions stored on a tangible, non-transitory, computer-readable memory (e.g., random access memory (RAM), read-only memory (ROM), FLASH memory, etc.). In an embodiment, the processors are configured to execute the instructions to perform packet processing operations based on a processing context. In some embodiments, the software or firmware instructions include computer-readable instructions that, when executed by the processor(s), cause the processor(s) to perform any of the various actions of packet processor 140 described herein. In one such embodiment, various components are implemented as respective software or firmware modules, with each module corresponding to instructions executed by packet processor 140. In this embodiment, the order of the various components shown in FIG. 4 corresponds only to orders of operation rather than physical location.

In another illustrative embodiment, packet processor 140 is a packet processing pipeline implemented in hardware, such as one or more application-specific integrated circuits (ASICs) or any other suitable type(s) of hardware circuit(s). In one such embodiment, various modules of the packet processor 140 are implemented as respective pipeline stages, respective groupings of pipeline stages, or respective portions of pipeline stages within packet processor 140. In a second embodiment, for example, packet processor 140 is configured to process packets at least partially in parallel (e.g., packets from ingress port IP1 and ingress port IP2).

After being processed by the packet processor 140, each descriptor 165 is sent to the queue manager 150 to be scheduled for transmission, in an embodiment. As described above, the descriptor 165 is a full descriptor or a lean descriptor, in various embodiments. The queue manager 150 maintains one or more egress queues (not shown in FIG. 4) that correspond to egress ports 105, packet flows and/or other suitable targets, and buffers descriptors 165 for the packets that are to be provided to the respective egress port, in an embodiment. In some embodiments, the queue manager 150 schedules the corresponding packets for transmission via the appropriate egress ports. In one such embodiment, packets are transmitted, in the scheduled order, by sending the queued descriptors 165 to respective egress ports associated with the queues. In various embodiments, the descriptors 165 include pointers to the plurality of memory cells 120. In some embodiments, the queue manager 150 sends queued descriptors 165 to a transmit direct memory access device (not shown) generally configured to retrieve/read the packets stored in the plurality of memory cells 120 and to provide the retrieved packets to a corresponding egress port of network device 100.

The network device 100 is implemented using one or more integrate circuits (ICs) configured to operate as discussed below. For example, the pluralities of ports 104 and 105, the memory unit 110, the packet processor 140, and/or the queue manager 150 may be implemented, at least partially, on separate ICs. As another example, at least a portion of the pluralities of ports 104 and 105, the memory 110, the packet processor 140, and/or the queue manager 150 may be implemented on a single IC.

Figure 5:
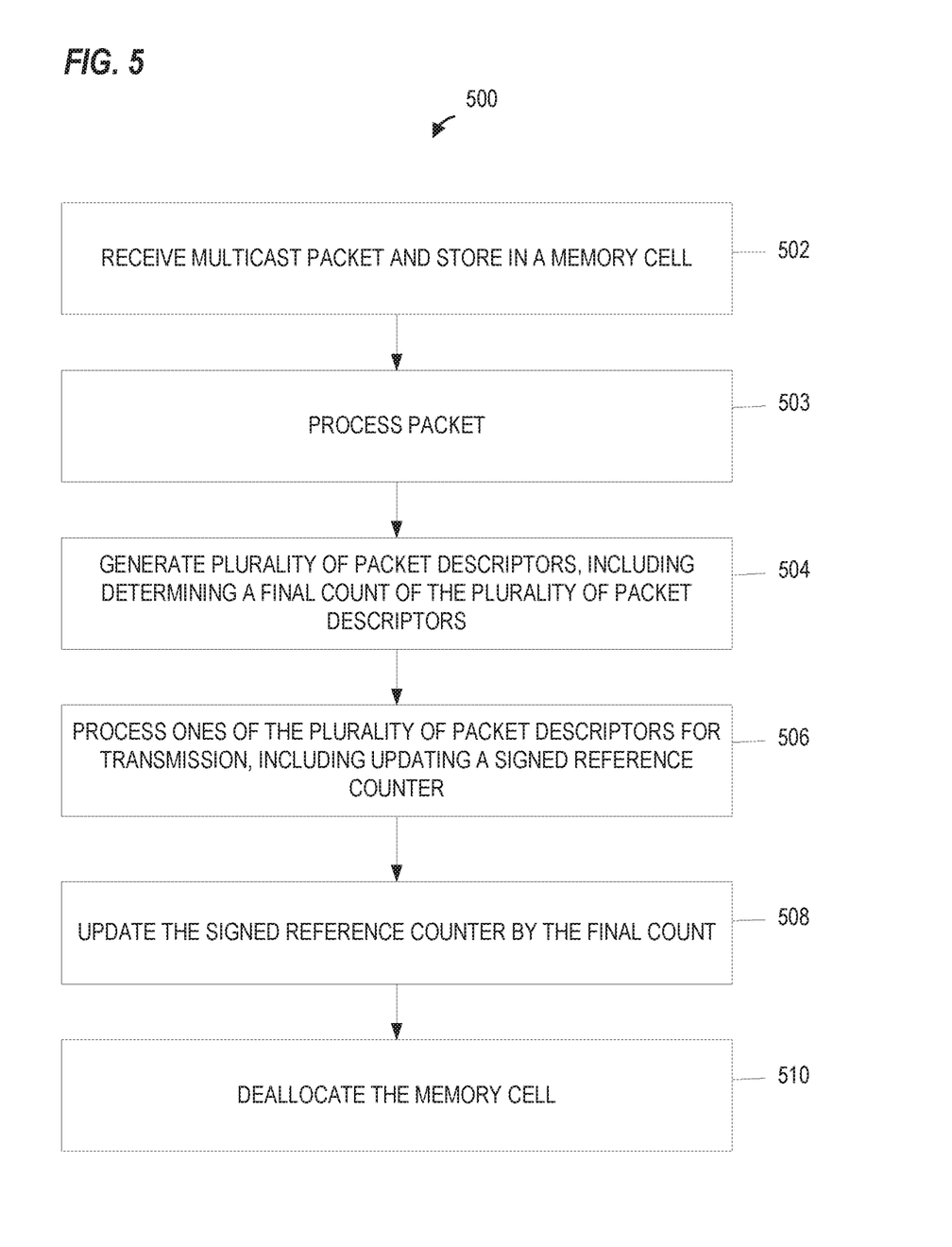
FIG. 5 is a flow diagram illustrating an example method, implemented in a network device coupled to a network, of deallocating memory in a first network device, according to an embodiment.

FIG. 5 is a flow diagram illustrating an example method 500 of deallocating memory in a first network device, according to an embodiment. In an embodiment, the method 500 is implemented by the network device 100, according to an embodiment. With reference to FIG. 4, the method 500 is implemented by one or more of the final count engine 145 and the transmission counter 108, in an embodiment.

At block 502, a multicast packet is received by the first network device from a computer network and the multicast packet is stored in a memory cell of the first network device, in an embodiment. In an embodiment, for example, the network device 100 receives the packet 160 at the ingress port IP1 from the network device 102 and stores the packet 160 in the memory cell 120 corresponding to address 1 of the memory 110. In an embodiment, the network device 100 stores the packet in a centralized memory that is shared by one or more packet processors 140. In an embodiment, the packet processor 140 receives the packet 160 from the ingress port IP1 and stores the packet 160 in the memory cell 120. In another embodiment, the ingress port IP1 stores the packet 160 in the memory cell 120 and provides the header 161 to the packet processor 140. In an embodiment, the network device 100 resets the signed reference counter 130 when storing the multicast packet in the memory cell. In some embodiments, the packet processor 140 is one of a plurality of packet processors of the network device 100. In an embodiment, the packet processor 140 resets the signed reference counter (e.g., sets the value to zero) when performing ingress processing for the packet.

At block 503, the packet processor 140 processes the packets, in an embodiment. Processing the packets includes at least determining a port or ports to which the packet is to be forwarded, in an embodiment. In some embodiments, processing the packet includes generating one or more modified headers, for example, generating the header 171.

At block 504, a plurality of egress descriptors corresponding to the multicast packet are generated by the first network device, in an embodiment. In an embodiment, the plurality of egress descriptors are "lean" descriptors that are different from ingress descriptor 164. In an embodiment, for example, the plurality of egress descriptors are utilized in egress processing operations for transmitting a multicast packet or broadcast packet to a plurality of destinations. The plurality of egress descriptors are for transmission of the multicast packet from the first network device to a plurality of second network devices 103 in the computer network, in an embodiment. In an embodiment, for example, the packet processor 140 generates a plurality of egress descriptors for the packet 160, for example, packet descriptors 165a, 165b, and 165c. Generation of the plurality of egress descriptors includes determining a final count of the plurality of the quantity of packet descriptors generated, in an embodiment. In some embodiments, the final count engine 145 of the packet processor 140 determines the final count. In the embodiment shown in FIG. 4, the plurality of second network devices includes network devices 103a, 103b, and 103c, the plurality of egress descriptors includes descriptors 165a, 165b, and 165c, and the final count is three.

In some embodiments, the packet processor 140 releases at least some of the plurality of egress descriptors for further processing (e.g., queuing by the queue manager 150, transmission by the egress ports, etc.) before the final count has been determined. In an embodiment, the packet processor 140 releases packet descriptors immediately after they are generated (or, soon thereafter), instead of delaying further processing until the final count has been determined. In the embodiment shown in FIG. 4, the packet descriptor 165a has been released for further processing, has been processed by the queue manager 150 (e.g., queued and released for transmission to the egress port, in an embodiment), and is being processed by the egress port EP4 before the final count has been determined. In an embodiment, a multicast packet is transmitted from the first network device to a second network device of the plurality of second network devices in the computer network based on the at least one packet descriptor before the final count has been determined. In some embodiments, transmitting the multicast packet from the first network device commences before at least some of the plurality of egress descriptors have been generated and before the final count has been determined. In one such embodiment, the network device 100 provides improved (i.e., reduced) processing delays and/or packet latency for multicast packets and broadcast packets because the at least some of the plurality of egress descriptors are provided gradually to the egress ports (e.g., as a more steady flow of packet descriptors), instead of providing a large number of packet descriptors as a "burst" of packet descriptors.

At block 506, ones of the plurality of egress descriptors are processed for transmission of the multicast packet from the first network device to the corresponding plurality of second network devices, in an embodiment. The processing includes updating a value of a signed reference counter corresponding to the multicast packet in a first direction before the final count has been determined and after a copy of the multicast packet has been received by an egress port of the first network device for a transmission corresponding to a packet descriptor of the plurality of egress descriptors, in an embodiment.

In an embodiment, the egress port EP4 receives a copy of the packet 160 from the memory cell 120 and decrements the signed reference counter 130. In the embodiment shown in FIG. 4, the transmission counter 108 sends an update command 166 ("RefCntUpdate(−1)") having a field with an update value of "−1" to the signed reference counter 130 to decrement the signed reference counter 130. In an embodiment, the transmission counter 108 extracts the update value from a field of the packet descriptor 165a. In another embodiment, the transmission counter 108 uses a default value for the update value, for example, −1, +1, or another suitable value. In an embodiment, the egress port EP4 sends the update command 166 in response to receiving a copy of the packet 160 from the memory unit 110. In another embodiment, the egress port EP4 sends the update command 166 in response to a successful transmission of the packet 170. In yet another embodiment, the update command 166 is included within a read command for the memory cell 120.

At block 508, the value of the signed reference counter is updated in a second direction opposite the first direction by the final count of the plurality of egress descriptors after the final count has been determined, in various embodiments. In an embodiment, for example, the final count engine 145 sends an update command 168 ("RefCntUpdate(+Final-Count)") having a field with an update value equal to the final count (e.g., +3 for the packet 160). In this embodiment, the final count is added to a current value of the signed reference counter 130. In another embodiment, the packet processor 140 buffers or "holds back" one packet descriptor of the plurality of egress descriptors 165 until the final count has been determined. In this embodiment, the packet processor 140 delays further processing of the packet descriptor, for example, a "final count" packet descriptor, until after the final count has been determined and includes an indication of the final count as a field within the final count packet descriptor. In an embodiment, for example, the packet processor 140 delays processing of the packet descriptor 165c and sets the field to +3 (e.g., Cnt=+3 instead of Cnt=−1). In an embodiment, the packet processor 140 generates the final count packet descriptor after the final count has been determined. In an embodiment, the value of the signed reference counter is updated in the first direction for each transmission corresponding to the plurality of egress descriptors and the value of the signed reference counter is updated in the second direction by the final count in response to the determination of the final count of the plurality of egress descriptors.

At block 510, the memory cell is deallocated when cumulative updates to the value of the signed reference counter in the first direction are equal to the update of the value of the signed reference counter in the second direction and maintaining the multicast packet in the memory cell while the cumulative updates are not equal to the final count, in an embodiment. In the embodiment shown in FIG. 4, for example, the memory cell is deallocated in an embodiment when an absolute value of the cumulative updates in the first direction (i.e., three decrements of −1) are equal to an absolute value of the final count (e.g., +3). In an embodiment, the network device 100 resets the signed reference counter 130 when deallocating the memory cell.

Figure 6A:
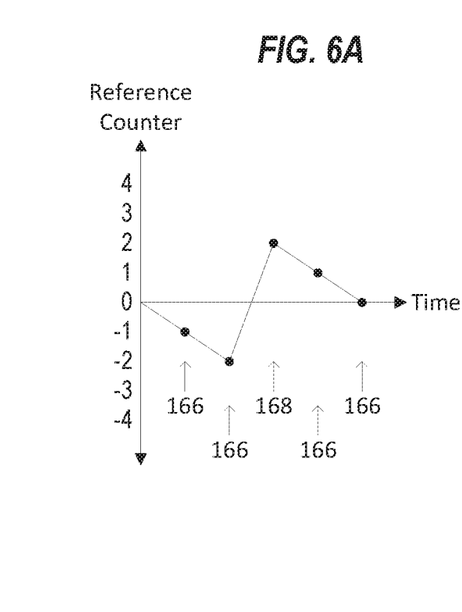
FIGS. 6A, 6B, and 6C are diagrams of example timelines for values of a signed reference counter, according to various embodiments.
Figure 6B:
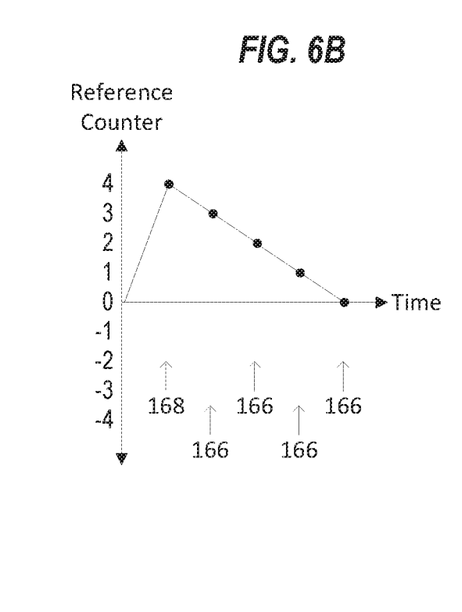
Figure 6C:
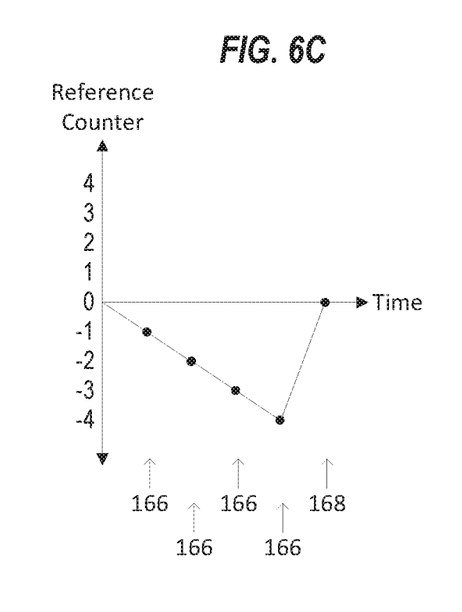

FIGS. 6A, 6B, and 6C are diagrams of example timelines for values of a signed reference counter, according to various embodiments. In the embodiments of FIGS. 6A, 6B, and 6C, a multicast packet is transmitted to four egress ports, and thus the packet processor 140 generates four packet descriptors and determines the final count to be equal to four. In various embodiments and/or scenarios, variations in processing duration for different packet descriptors, for example, based on delays in forwarding table lookups, memory congestion, available processing pipelines, etc. result in the update commands 166 and update command 168 being processed at different times relative to each other. The signed reference counter 130 compensates for these different times by allowing for updates in both positive and negative directions.

In some embodiments, the transmission of instances of the multicast packet (or broadcast packet) begins before the final count is completed. In an embodiment, for example, the final count engine 145 increments the final count upon generation of new egress descriptors 165, in parallel to updates to the signed reference counter 130 upon generation or transmission of a packet to be egressed (e.g., packet 170) based on previously generated egress descriptors. In an embodiment, the updates to the signed reference counter 130 upon generation or transmission of the packet to be egressed are performed independently of each other. In the embodiment shown in FIG. 6A, the signed reference counter 130 receives, in order, a first update command 166 (−1), a second update command 166 (−1), a final count update 168 (+4), a third update command 166 (−1), and a fourth update command 166 (−1). In this embodiment, the first update command and second update command are performed before the final count is completed. After the fourth update command 166, the value of the signed reference counter 130 is zero (e.g., cumulative updates to the value of the signed reference counter 130 in a first direction are equal to the update of the value of the signed reference counter 130 in the second direction), and the network device 100 deallocates the corresponding memory cell.

In the embodiment shown in FIG. 6B, the signed reference counter 130 receives, in order, a final count update 168 (+4), a first update command 166 (−1), a second update command 166 (−1), a third update command 166 (−1), and a fourth update command 166 (−1). In this embodiment, the final count update is performed before any of the update commands 166 (e.g., update commands corresponding to a transmission of the multicast packet). After the fourth update command 166, the value of the signed reference counter 130 is zero and the network device 100 deallocates the corresponding memory cell.

In the embodiment shown in FIG. 6C, the signed reference counter 130 receives, in order, a first update command 166 (−1), a second update command 166 (−1), a third update command 166 (−1), a fourth update command 166 (−1), and a final count update 168 (+4). In this embodiment, the first, second, third, and fourth update commands are performed before the final count is completed. After the final count update 168, the value of the signed reference counter 130 is zero and the network device 100 deallocates the corresponding memory cell.

Figure 7A:
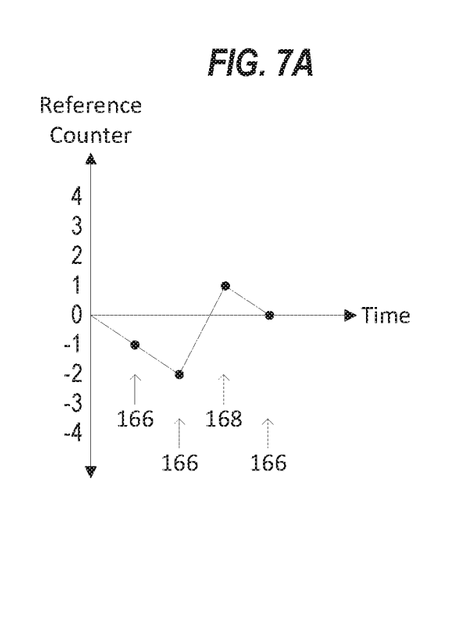
FIGS. 7A, 7B, and 7C are diagrams of example timelines for values of a signed reference counter, according to various embodiments.
Figure 7B:
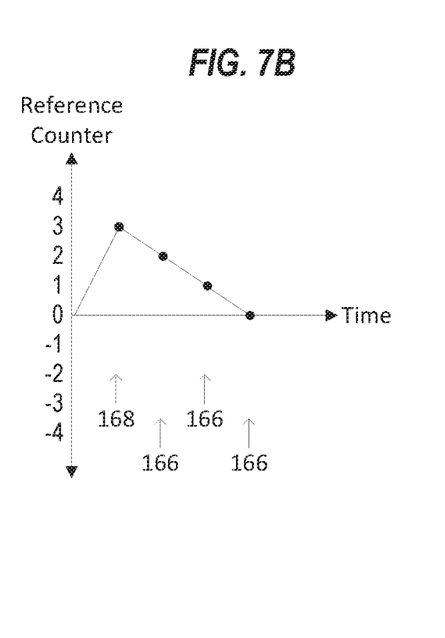
Figure 7C:
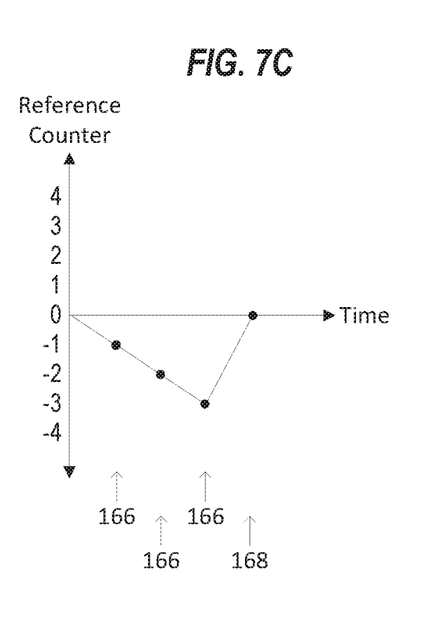

FIGS. 7A, 7B, and 7C are diagrams of example timelines for values of a signed reference counter, according to various embodiments. In the embodiments of FIGS. 7A, 7B, and 7C, a multicast packet is transmitted to four egress ports, and thus the packet processor 140 generates four packet descriptors and determines the final count to be equal to four, in a similar manner as that described above with respect to FIGS. 6A, 6B, and 6C. In the embodiments shown in FIGS. 7A, 7B, and 7C, the packet processor 140 does not send the final count update 168, but instead includes a modified final count within a final count packet descriptor.

In the embodiment shown in FIG. 7A, the signed reference counter 130 receives, in order, a first update command 166 (−1), a second update command 166 (−1), a third update command 166 (+3), and a fourth update command 166 (−1). After the fourth update command 166, the value of the signed reference counter 130 is zero and the network device 100 deallocates the corresponding memory cell.

In the embodiment shown in FIG. 7B, the signed reference counter 130 receives, in order, a first update command 166 (+3), a second update command 166 (−1), a third update command 166 (−1), and a fourth update command 166 (−1). After the fourth update command 166, the value of the signed reference counter 130 is zero and the network device 100 deallocates the corresponding memory cell.

In the embodiment shown in FIG. 7C, the signed reference counter 130 receives, in order, a first update command 166 (−1), a second update command 166 (−1), a third update command 166 (−1), and a fourth update command 166 (+3). After the fourth update command 166, the value of the signed reference counter 130 is zero and the network device 100 deallocates the corresponding memory cell.

In some embodiments, the first update direction and second direction are reversed. In other words, the transmission counter 108 updates the signed reference counter 130 by +1 and the packet processor 140 subtracts the final count from the signed reference counter 130.

In an embodiment, the network device 100 includes a memory controller (not shown) that receives the update commands 166 from the egress ports and receives the update commands 168 from the packet processor 140. In another embodiment, the memory controller includes the transmission counter 108 and increments/decrements the signed reference counter 130 based on a read request from an egress port instead of the update commands. In this embodiment, the egress ports do not need to be modified to handle the update commands or to extract the update values from the packet descriptors 165.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for deallocating memory in a first network device, the method comprising:
receiving, at the first network device, a multicast packet received from a computer network and storing the multicast packet in one or more memory cells of a memory unit of the first network device;
generating, by the first network device, a plurality of egress descriptors corresponding to the multicast packet, the egress descriptors for transmission of the multicast packet from the first network device to a plurality of second network devices in the computer network, the generating including determining a final count of a number of the plurality of egress descriptors corresponding to the multicast packet;
processing, by the first network device, ones of the plurality of egress descriptors for transmission of the multicast packet from the first network device to the corresponding plurality of second network devices, the processing including updating a value of a signed reference counter corresponding to the multicast packet in a first direction before the final count is determined during the generating and after a copy of the multicast packet has been received by an egress port of the first network device for a transmission corresponding to an egress descriptor of the plurality of egress descriptors;
updating, by the one or more integrated circuits, the value of the signed reference counter in a second direction opposite the first direction by the final count after the final count is determined; and
deallocating, by the one or more integrated circuits, the one or more memory cells when cumulative updates to the value of the signed reference counter in the first direction are equal to the update of the value of the signed reference counter in the second direction and maintaining the multicast packet in the one or more memory cells while the cumulative updates are not equal to the final count.

2. The method of claim 1, wherein processing the plurality of egress descriptors comprises, before the final count is determined:
generating at least one copy of the multicast packet by reading packet portions corresponding to the multicast packet from the memory unit based on at least one egress descriptor of the plurality of egress descriptors; and
transmitting the at least one copy of the multicast packet from the first network device to a second network device of the plurality of second network devices in the computer network based on the at least one egress descriptor.

3. The method of claim 2, wherein transmitting the multicast packet from the first network device is performed before at least some of the plurality of egress descriptors have been generated and before the final count is determined.

4. The method of claim 1, wherein:
processing the plurality of egress descriptors comprises updating the value of the signed reference counter in the first direction for each transmission corresponding to the plurality of egress descriptors; and
updating the value of the signed reference counter in the second direction comprises updating the value of the signed reference counter in the second direction by the final count in response to generation of new egress descriptors of the plurality of egress descriptors and the determination of the final count.

5. The method of claim 1, wherein:
generating the plurality of egress descriptors comprises generating a final count packet descriptor, of the plurality of egress descriptors, the final count packet descriptor being an egress descriptor that indicates the final count;
updating the value of the signed reference counter in the second direction comprises updating the value of the signed reference counter in the second direction by the value of the final count for a transmission corresponding to the final count packet descriptor of the plurality of egress descriptors; and updating the value of the signed reference counter corresponding to the multicast packet in the first direction comprises updating the value of the signed reference counter in the first direction for egress descriptors of the plurality of egress descriptors other than the final count packet descriptor.

6. The method of claim 5, wherein generating the final count packet descriptor comprises generating the final count packet descriptor after the final count is determined.

7. The method of claim 5, wherein generating the final count packet descriptor comprises:
generating the final count packet descriptor to include a field that represents the final count;
delaying processing of the final count packet descriptor for transmission from the first network device until the final count is determined;
updating the field of the final count packet descriptor with the final count when the final count is determined; and
releasing the final count packet descriptor, after the field of the final count packet descriptor has been updated with the final count, for processing for transmission from the first network device.

8. The method of claim 1, wherein the first direction corresponds to decrementing the signed reference counter and the second direction corresponds to incrementing the signed reference counter.

9. The method of claim 1, wherein the method further comprises resetting the signed reference counter i) when storing the multicast packet in the one or more memory cells, or ii) when deallocating the one or more memory cells.

10. The method of claim 1, wherein:
updating the value of the signed reference counter in the second direction comprises subtracting the value of the final count from the value of the signed reference counter in response to the determination of the final count; and
processing ones of the plurality of egress descriptors comprises incrementing the value of the signed reference counter in the first direction upon transmission of a copy of the multicast packet through an egress port of the first network device.

11. A first network device, comprising:
an ingress port configured to receive a multicast packet from a computer network;
a plurality of egress ports from which the multicast packet is to be transmitted;
a memory unit having at least one memory cell;
one or more integrated circuits configured to:
store the multicast packet in one or more memory cells of the memory;
generate a plurality of egress descriptors corresponding to the multicast packet, the egress descriptors for transmission of the multicast packet from the first network device to a plurality of second network devices in the computer network, and to determine a final count of a number of the plurality of egress descriptors corresponding to the multicast packet;
process ones of the plurality of egress descriptors for transmission of the multicast packet from the first network device to the corresponding plurality of second network devices, the processing including updating a value of a signed reference counter corresponding to the multicast packet in a first direction before the final count is determined during the generation and after a copy of the multicast packet has been received by an egress port of the first network device for a transmission corresponding to an egress descriptor of the plurality of egress descriptors;
update the value of the signed reference counter in a second direction opposite the first direction by the final count after the final count is determined; and
deallocate the one or more memory cells when cumulative updates to the value of the signed reference counter in the first direction are equal to the update of the value of the signed reference counter in the second direction and maintaining the multicast packet in the one or more memory cells while the cumulative updates are not equal to the final count.

12. The first network device of claim 11, wherein the one or more integrated circuits are configured to:
generate at least one copy of the multicast packet by reading packet portions corresponding to the multicast packet from the memory unit based on at least one egress descriptor of the plurality of egress descriptors before the final count is determined; and
transmit the at least one copy of the multicast packet from the first network device to a second network device of the plurality of second network devices in the computer network based on the at least one egress descriptor before the final count has been determined.

13. The first network device of claim 12, wherein the one or more integrated circuits are configured to transmit the at least one copy of the multicast packet from the first network device before at least some of the plurality of egress descriptors have been generated and before the final count determined.

14. The first network device of claim 11, wherein:
the one or more integrated circuits are configured to update the value of the signed reference counter in the first direction for each transmission corresponding to the plurality of egress descriptors; and
the one or more integrated circuits are configured to update the value of the signed reference counter in the second direction by the final count in response to generation of new egress descriptors of the plurality of egress descriptors and the determination of the final count.

15. The first network device of claim 11, wherein the one or more integrated circuits are configured to:
generate a final count packet descriptor, of the plurality of egress descriptors, the final count packet descriptor being an egress descriptor that indicates the final count;
update the value of the signed reference counter in the second direction by the value of the final count for a transmission corresponding to the final count packet descriptor of the plurality of egress descriptors; and
update the value of the signed reference counter in the first direction for egress descriptors of the plurality of egress descriptors other than the final count packet descriptor.

16. The first network device of claim 15, wherein the one or more integrated circuits are configured to generate the final count packet descriptor after the final count is determined.

17. The first network device of claim 15, wherein the one or more integrated circuits are configured to:
generate the final count packet descriptor to include a field that represents the final count;
delay processing of the final count packet descriptor for transmission from the first network device until the final count is determined;
update the field of the final count packet descriptor with the final count when the final count is determined; and release the final count packet descriptor, after the field of the final count packet descriptor has been updated with the final count, for processing for transmission from the first network device.

18. The first network device of claim 11, wherein the first direction corresponds to decrementing the signed reference counter and the second direction corresponds to incrementing the signed reference counter.

19. The first network device of claim 11, wherein the one or more integrated circuits are configured to reset the signed reference counter i) when storing the multicast packet in the one or more memory cells, or ii) when deallocating the one or more memory cells.

20. The first network device of claim 11, wherein:
the one or more integrated circuits are configured to subtract the value of the final count from the value of the signed reference counter in response to the determination of the final count; and
the one or more integrated circuits are configured to increment the value of the signed reference counter in the first direction for each copy of the multicast packet transmitted by egress ports of the first network device.

\* \* \* \* \*